US008440103B2

(12) United States Patent
Fukui et al.

(10) Patent No.: US 8,440,103 B2
(45) Date of Patent: May 14, 2013

(54) BINDER RESIN COMPOSITION AND INORGANIC FINE PARTICLE-DISPERSED PASTE COMPOSITION

(75) Inventors: Hiroji Fukui, Osaka (JP); Shigeru Nomura, Osaka (JP); Takamaro Kakehi, Osaka (JP); Kenji Yamauchi, Osaka (JP); Takahiro Oomura, Osaka (JP); Miki Inaoka, Osaka (JP)

(73) Assignee: Sekisui Chemical Co., Ltd., Osaka (JP)

( * ) Notice: Subject to any disclaimer, the term of this patent is extended or adjusted under 35 U.S.C. 154(b) by 706 days.

(21) Appl. No.: 11/887,209

(22) PCT Filed: Dec. 20, 2005

(86) PCT No.: PCT/JP2005/023401
§ 371 (c)(1),
(2), (4) Date: Nov. 26, 2007

(87) PCT Pub. No.: WO2006/112089
PCT Pub. Date: Oct. 26, 2006

(65) Prior Publication Data
US 2009/0050850 A1   Feb. 26, 2009

(30) Foreign Application Priority Data

Mar. 31, 2005 (JP) ................. 2005-104347
Jul. 5, 2005 (JP) ................. 2005-195768
Nov. 7, 2005 (JP) ................. 2005-322330

(51) Int. Cl.
C09K 11/02 (2006.01)
C08F 222/20 (2006.01)
C08K 5/053 (2006.01)

(52) U.S. Cl.
USPC ....... 252/301.36; 524/386; 524/388; 524/560

(58) Field of Classification Search ............. 252/301.36; 524/386, 388, 560
See application file for complete search history.

(56) References Cited

U.S. PATENT DOCUMENTS

| | | | |
|---|---|---|---|
| 4,492,783 A * | 1/1985 | Tanaka et al. | 524/430 |
| 4,598,111 A * | 7/1986 | Wright et al. | 524/40 |
| 4,990,582 A | 2/1991 | Salamone | |
| 6,046,121 A * | 4/2000 | Masuko et al. | 501/20 |
| 6,183,669 B1 * | 2/2001 | Kubota et al. | 156/89.16 |
| 6,758,062 B2 * | 7/2004 | Watanabe et al. | 65/17.3 |
| 7,011,703 B1 * | 3/2006 | Craig | 106/447 |
| 2004/0028592 A1 * | 2/2004 | Akimoto et al. | 423/263 |
| 2005/0186407 A1 * | 8/2005 | Mori et al. | 428/210 |

FOREIGN PATENT DOCUMENTS

| | | | |
|---|---|---|---|
| JP | 03195785 A | * | 8/1991 |
| JP | 4-178476 | | 6/1992 |
| JP | 7-48539 | | 2/1995 |
| JP | 07048539 A | * | 2/1995 |
| JP | 7-242853 | | 9/1995 |
| JP | 07242853 A | * | 9/1995 |
| JP | 8-157524 | | 6/1996 |
| JP | 08157524 A | * | 6/1996 |
| JP | 9-31320 | | 2/1997 |
| JP | 09031320 A | * | 2/1997 |
| JP | 9-208640 | | 8/1997 |
| JP | 2000063181 A | * | 2/2000 |
| JP | 2000-144124 | | 5/2000 |
| JP | 2001057152 A | * | 2/2001 |
| JP | 2002-60673 | | 2/2002 |
| JP | 2002-294176 | | 10/2002 |
| JP | 2003-96305 | | 4/2003 |
| WO | 03/077792 | | 9/2003 |

OTHER PUBLICATIONS

JP03195785A, Derwent Abstract, Aug. 1991, Yoshida et al.*
JP2000063181A, Feb. 2000, Miyazaki et al., Machine Translation.*
JP07242853A, Sep. 1995, Kajiwara et al., Machine Translation.*
JP2001057152A, Feb. 2001, Kawashima et al., Machine translation.*
http://www.dow.com/productsafety/finder/dgbe.htm, May 5, 2006.*
Office Action dated May 20, 2010 for counterpart European Application No. 05 820 270.6.

* cited by examiner

Primary Examiner — Satya Sastri
(74) Attorney, Agent, or Firm — Wenderoth, Lind & Ponack, L.L.P.

(57) ABSTRACT

It is an object of the present invention to provide a binder resin composition usable for an inorganic fine particle-dispersed paste composition which is excellent in thixotropy and storage stability, has scarcely changeable screen printability with the lapse of time, and can be fired at a low temperature, and to provide the inorganic fine particle-dispersed paste composition.

The present invention is directed to a binder resin composition, which contains a binder comprising a (meth)acrylic resin, an organic compound having 3 or more hydroxyl groups, and an organic solvent, the content of the organic compound having 3 or more hydroxyl groups being 0.1 to 15 parts by weight to 100 parts by weight of the (meth)acrylic resin.

16 Claims, No Drawings

BINDER RESIN COMPOSITION AND INORGANIC FINE PARTICLE-DISPERSED PASTE COMPOSITION

This application is a U.S. national stage of International Application No. PCT/JP2005/023401 filed Dec. 20, 2005.

TECHNICAL FIELD

The present invention relates to a binder resin composition usable for an inorganic fine particle-dispersed paste composition which is excellent in thixotropy and storage stability, has scarcely changeable screen printability with the lapse of time, and can be fired at a low temperature, and relates to the inorganic fine particle-dispersed paste composition.

BACKGROUND ART

Recently, paste compositions comprising resin binders in which inorganic fine particles such as conductive powders and ceramic powders are dispersed have been used to obtain sintered bodies in various shapes. Particularly, phosphor paste compositions comprising resin binders in which phosphors as inorganic fine particles are dispersed have been used for PDP (Plasma Display Panel), FED (Field Emission Display), SED (Surface Conduction Electron Emission Display), and the like and demands for them have been increasing in these years.

PDP is a display for carrying out display action by exciting phosphors and emitting phosphors by ultraviolet rays generated by gas electric discharge. In PDP, an ultraviolet-excitation type phosphor layer is formed in an electric discharge space and the phosphor layer is excited by the electric discharge to display with a color different from the light color emitted by the electric discharge gas. Generally, PDP for color display has phosphor layers of three colors; red (R), green (G), and blue (B).

Conventionally, each phosphor layer of R, G, and B is formed by processing a phosphor paste composition, mainly comprising phosphor particles in powder state and ethyl cellulose, into a prescribed shape every color by applying method using such as a screen printing method or a doctor blade method; or by a casting method in order to process the paste composition into a sheet, and successively firing the paste composition. Among them, the screen printing method is a method suitable for mass production. However, ethyl cellulose is inferior in thermal decomposability and requires a high temperature for completely remove an organic component and therefore, binder resin compositions excellent in low temperature decomposability have been developed.

For example, Patent Document No. 1 discloses a method of forming a phosphor layer for each of R, G, and B by applying a phosphor paste composition comprising a specified resin binder and a phosphor to a substrate by the screen printing method, pre-baking the paste composition after the application, thereby removing the organic solvent, carrying out exposure and development, and finally firing the composition.

Further, Patent Document No. 2 discloses a method of forming a phosphor layer by transferring a phosphor paste composition in form of a film containing phosphor particles, a (meth)acrylic type resin binder, and glycerin-1,2-diacetyl-3-monolaurate to a substrate and firing the transferred resin composition layer.

To carry out the screen printing well, it is required for the paste composition to have a so-called thixotropic property (hereinafter, also referred to as thixotropy), that is a sufficiently low viscosity and be easy for application at the time of application and contrarily that is a sufficiently high viscosity to avoid spontaneous flow out at the time the paste composition is kept still and dried after application. Herein, the thixotropy means a property, that is, in the case the viscosity is evaluated by a rotary viscometer, the viscosity becomes low when the rotation speed is high (displacement at a high strain rate) and the viscosity becomes high when the rotation speed is low (displacement at a low strain rate).

In consideration of the process of printing a paste composition on a substrate by screen printing and successively thermally decomposing a binder composition in the paste composition by heating and firing to form a layer of an inorganic component, which has been previously dispersed in the paste composition, various investigations have been made to provide thixotropy with an acrylic resin binder. For example, Patent Document No. 3 discloses a paste composition containing silica fine particles in order to improve the thixotropy. However, since the silica fine particles are produced by a sol-gel method or the like from a row material such as tetraethoxysilane or the like, the silica fine particles have a reactive functional group on the surfaces and tend to coagulate one another. Accordingly, the silica fine particles are inferior in dispersibility and also in the storage stability because of proceeding of the coagulation with the lapse of time and it results in a problem that the screen printability is deteriorated with the lapse of time.

Further, since the silica fine particles are not decomposed even by firing, they remain in a final product.

Patent Document No. 1: Japanese Kokai Publication Hei-9-208640

Patent Document No. 2: Japanese Kokai Publication 2003-96305

Patent Document No. 3: Japanese Kokai Publication 2000-144124

DISCLOSURE OF THE INVENTION

Problems which the Invention is to Solve

In view of the above-mentioned state of the art, the present invention aims to provide a binder resin composition usable for an inorganic fine particle-dispersed paste composition which is excellent in thixotropy and storage stability, has scarcely changeable screen printability with the lapse of time, and can be fired at a low temperature, and aims to provide the inorganic fine particle-dispersed paste composition.

Means for Solving the Object

The present invention provides a binder resin composition, which contains a binder comprising a (meth)acrylic resin, an organic compound having 3 or more hydroxyl groups, and an organic solvent, the content of the organic compound having 3 or more hydroxyl groups being 0.1 to 15 parts by weight to 100 parts by weight of the (meth)acrylic resin.

Hereinafter, the present invention will be described in detail.

The present inventors found, as a result of diligent examination, that a binder resin composition containing a binder comprising a (meth)acrylic resin, an organic compound having 3 or more hydroxyl groups, and an organic solvent could form a hydrogen bond network and showed high thixotropy, and accordingly the binder resin composition could make it possible to easily produce a paste composition with improved cobwebbing and storage stability by being mixed with various kinds of additives. These findings have now led to completion of the present invention.

The binder resin composition of the present invention contains a binder comprising a (meth)acrylic resin.

Non-limiting examples of the above-mentioned (meth) acrylic resin are resins comprising polymers such as, homopolymers of (meth)acrylate monomers; copolymers of two or more (meth)acrylate monomers; and copolymers of (meth)acrylate monomers and vinyl type monomers other than the (meth)acrylate monomers. Further, above-mentioned (meth)acrylic resin may be a mixture resin of the resins comprising these polymers and resins of polymers other than these polymers.

Among them, particularly preferable examples to be used are copolymers of (meth)acrylate monomers and polyoxyalkylene (meth)acrylate monomers or mixtures of homopolymers of (meth)acrylate monomers and copolymers of (meth) acrylate monomers and polyoxyalkylene (meth)acrylate monomers.

In this description, (meth)acrylate means acrylate and methacrylate.

Non-limiting examples of the above-mentioned (meth) acrylate monomers are methyl (meth)acrylate, ethyl (meth) acrylate, propyl (meth)acrylate, n-butyl (meth)acrylate, tert-butyl (meth)acrylate, isobutyl (meth)acrylate, cyclohexyl (meth)acrylate, 2-ethylhexyl (meth)acrylate, isobornyl (meth)acrylate, n-stearyl (meth)acrylate, benzyl (meth)acrylate, glycerol (meth)acrylate, 2-hydroxyethyl (meth)acrylate, hydroxypropyl mono(meth)acrylate, glycerin di(meth)acrylate, 2-hydroxy-3-acryloyloxypropyl (meth)acrylate and the like, and one or two or more of the (meth)acrylate monomers having 10 or less carbon atoms are particularly preferable among them.

In the present invention, methyl methacrylate (MMA) is particularly preferably used since even if a binder resin composition to be obtained is fired, no coloration occurs and the composition does not contaminate a substrate or the like.

Non-limiting examples of the above-mentioned polyoxyalkylene (meth)acrylate monomers are (meth)acrylic acid esters of polymethylene glycol, polyacetal, polyethylene glycol, polypropylene glycol, polytrimethylene glycol, polytetramethylene glycol, and polybutylene glycol, and the like. Among them, particularly preferable examples to be used among them are (meth)acrylic acid esters of polyethylene glycol monomethacrylate, polypropylene glycol monomethacrylate, and polytetramethylene glycol and an even more preferable examples are a (meth)acrylic acid ester of polypropylene glycol since it can be decomposed at a lower temperature, and polypropylene glycol monomethacrylate since it exhibits sufficient thixotropy in the case it is copolymerized with methyl methacrylate (MMA), as will be described later.

Further, in place of the above-mentioned polyoxyalkylene (meth)acrylate monomer, as a (meth)acrylate monomer containing oxyalkylene groups defined by the following formula (I), oxyalkylene di(meth)acrylates such as oxyalkylene mono(meth)acrylate, ethylene glycol dimethacrylate, and propylene glycol dimethacrylate, and the like may also be used.

[Chemical formula 1]

(1)

Non-limiting examples of the above-mentioned vinyl type monomers other than the (meth)acrylate monomers are maleic anhydride, maleimide derivatives, N-vinylpyrrolidone, N-acryloyl morpholine, N-vinylcaprolactone, N-vinyl piperidine, N-vinylformamide, N-vinylacetamide, styrene, indene, α-methylstyrene, p-methylstyrene, p-chlorostyrene, p-chloromethylstyrene, p-methoxystyrene, p-tert-butoxystyrene, divinylbenzene, vinyl acetate, vinyl propionate, vinyl butyrate, vinyl caproate, vinyl benzoate, vinyl cinnamate and the like, and their derivatives. These vinyl type monomers may be used alone or two or more of them may be used in combination.

The above-mentioned (meth)acrylic resin is preferably a block copolymer or a graft copolymer. Accordingly, the binder resin composition of the present invention becomes easy to be decomposed at the time of firing.

In the case a polyoxyalkylene mono(meth)acrylate as described above is used as the above-mentioned polyoxyalkylene (meth)acrylate monomer, a graft copolymer containing an oxyalkylene group in a side chain can be produced and in the case an oxyalkylene di(meth)acrylate as described above is used, a block copolymer containing an oxyalkylene group in a main chain can be produced.

In the binder resin composition of the present invention, the above-mentioned (meth)acrylic resin has preferably constituent units derived from a (meth)acrylate monomer having 10 or less carbon atoms in an ester residue and a polyoxyalkylene (meth)acrylate monomer. It is because since a binder with such a composition has a low decomposition temperature, the binder resin composition of the present invention can be fired at a low temperature. In this description, firing at a low temperature means that the firing temperature at which 99.5% of the initial weight of the (meth)acrylic resin and the organic compound having 3 or more hydroxyl groups is lost is a low temperature and actually it means the firing temperature in normal atmospheric air with no replacement with nitrogen is in a range from 250 to 400° C.

In the present invention, among the exemplified polymers, use of a copolymer of methyl methacrylate (MMA) and polypropylene glycol monomethacrylate as the above-mentioned (meth)acrylic resin makes it possible to avoid coloration of the binder resin composition to be obtained even at the time of firing and accordingly the copolymer causes no contamination of the substrate or the like, and use of the copolymer also improves thixotropy since the hydrogen-bonding functional groups of the copolymers and OH groups of the organic compound having 3 or more hydroxyl groups to be described later form a hydrogen bond network and therefore, the copolymer is particularly preferable.

The above-mentioned (meth)acrylic resin is preferable to have the number average molecular weight of 5000 in the lower limit and 200000 in the upper limit based on conversion into polystyrene measured by gel permeation chromatography (GPC). If the number average molecular weight based on conversion into polystyrene is less than 5000, the formability of an inorganic fine particle-dispersed paste composition, which will be described later, may possibly become inferior and if it exceeds 200000, viscosity of the binder resin composition of the present invention to be obtained may become so high as to lower the screen printability. The upper limit is more preferably 100000.

In the case of measuring the number average molecular weight based on conversion into polystyrene by GPC, column LF-804 manufactured by SHOKO Co., Ltd., or the like may be employed as a column.

The ratio of the above-mentioned (meth)acrylic resin in the binder resin composition of the present invention is not particularly limited, however since the (meth)acrylic resin as the binder resin generally shows adherence, it is preferably 60% by weight in the upper limit and more preferably 40% by weight in the upper limit in consideration of the washing easiness of the binder resin composition of the present invention at the time of screen printing.

Non-limiting examples of the polymerization method of the above-mentioned (meth)acrylic resin are conventionally known methods for polymerizing (meth)acrylic monomers and a free-radical polymerization method, a living radical polymerization method, an iniferter polymerization method, an anion polymerization method, a living anion polymerization method and the like.

The binder resin composition of the present invention contains an organic compound having 3 or more hydroxyl groups.

The above-mentioned organic compound having 3 or more hydroxyl groups is added in order to improve the thixotropy of the binder resin composition of the present invention.

Non-limiting examples of the above-mentioned organic compound having 3, or more hydroxyl groups are glycerin, diglycerin, trimethylolpropane, pentaerythritol, meso-erythritol, L-threitol, D-threitol, DL-threitol, 2-hydroxymethyl-1,3-propanediol, 1,1,1-trihydroxymethylethane, 1,2,4-butanetriol, 1,2,6-hexanetriol and the like. Among them, glycerin is particularly preferably used since it is liquid at a normal temperature and can exhibit sufficient thixotropy.

The content of the above-mentioned organic compound having 3 or more hydroxyl groups is 0.1 parts by weight in the lower limit and 15 parts by weight in the upper limit to 100 parts by weight of the above-mentioned (meth)acrylic resin. If it is less than 0.1 parts by weight, sufficient thixotropy cannot be obtained and if it exceeds 15 parts by weight, storage stability may become inferior, soot may be generated or low temperature decomposition becomes impossible since a large quantity of oxygen is contained. It is more preferably 12 parts by weight in the upper limit and even more preferably 10 parts by weight in the upper limit.

The binder resin composition of the present invention contains an organic solvent.

Non-limiting examples of the organic solvent are terpineol, ethylene glycol ethyl ether, ethylene glycol monobutyl ether, ethylene glycol monoethyl ether acetate, butyl carbitol, butyl carbitol acetate, isophorone, butyl lactate, dioctyl phthalate, dioctyl adipate, benzyl alcohol, phenylpropylene glycol, cresol, and the like. Among them, terpineol, butyl carbitol, butyl carbitol acetate and the like are preferable since solubility of the binder comprising the above-mentioned (meth) acrylic resin is good.

These organic solvents may be used alone or two or more of them may be used in combination.

The addition amount of the above-mentioned organic solvent is not particularly limited, however in consideration of storage stability and the like, the amount of solvents which are possibly separated during the long term storage is preferably as slight as possible, and it is preferably 200 parts by weight in the lower limit and 800 parts by weight in the upper limit to 100 parts by weight of the above-mentioned (meth)acrylic resin.

The binder resin composition of the present invention preferably further contains organic fine particles. Use of the organic fine particles in combination with the above-mentioned organic compound having 3 or more hydroxyl groups further improves the thixotropy of the binder resin composition of the present invention.

Further, as described later, in the case an inorganic fine particle-dispersed paste composition is produced using the binder resin composition of the present invention, addition of the above-mentioned organic fine particles improves the thixotropy and cobwebbing and at the same time makes it possible to produce an inorganic fine particle-dispersed paste composition which can be decomposed at a lower temperature.

Non-limiting examples of the raw materials of the above-mentioned organic fine particles are preferably (meth)acrylic resins. Non-limiting examples of the above-mentioned (meth)acrylic resins are preferably those which have high molecular weight and are obtained by radical polymerization of methyl methacrylate (MMA), isobutyl methacrylate (IBMA), polypropylene glycol ether macromer, polyoxyalkylene (meth)acrylate or the like.

The number of the functional groups of the raw material monomers, the production process of the above-mentioned (meth)acrylic resins, and the like are not particularly limited.

The above-mentioned organic fine particles are preferably (meth)acrylic resin fine particles having a constituent unit derived from a (meth)acrylate monomer and a polyoxyalkylene (meth)acrylate monomer having 10 or less carbon atoms in the ester residue as described above. It is because addition of the organic fine particles provides proper thixotropy and cobwebbing to the binder resin composition of the present invention and the inorganic fine particle-dispersed paste composition, which will be described later, and makes these compositions capable of being fired at a low temperature.

Further, the above-mentioned organic fine particles are not particularly limited, however crosslinked fine particles having a crosslinked structure are preferable. Depending on the kind of the organic solvent to be used, the organic solvent may swell the organic fine particles; however it is made possible to suppress the change of the physical properties of the binder resin composition attributed to the swelling of the organic fine particles if the organic fine particles are crosslinked fine particles.

The content of the above-mentioned organic fine particles is not particularly limited, however it is preferably 0.1% by weight in the lower limit and 20% by weight in the upper limit to the entire weight of the binder resin composition of the present invention. If it is lower than 0.1% by weight, the effect to improve thixotropy and cobwebbing cannot be obtained and if it exceeds 20% by weight, the paste viscosity is increased and the screen printability is lowered in some cases. It is more preferably 0.5% by weight in the lower limit and 10% by weight in the upper limit.

The particle diameter of the above-mentioned organic fine particle is not particularly limited, however it is preferably 0.1 μm in the lower limit and 10 μm in the upper limit based on the volume average particle diameter. If it is smaller than 0.1 μm, the organic fine particle may not work as basic points of thread breakage at the time of elongation of the inorganic fine particle-dispersed paste composition, which will be described later, and on the other hand, if it exceeds 10 μm, a problem that the organic fine particle is clogged in a mesh for screen printing may be caused. It is more preferably 7 μm in the upper limit.

A production method of the binder resin composition of the present invention is not particularly limited and conventionally known stirring methods may be employed. More practically, the method may be a method of stirring the above-mentioned binder comprising the (meth)acrylic resin, the organic compound having 3 or more hydroxyl groups, the organic solvent, and the organic fine particles to be added properly by three rolls, a ball mill, a planetary stirrer, or the like.

Since the binder resin composition of the present invention is constituted as described above, the composition can form a hydrogen bond network in the composition itself and is thus excellent in thixotropy.

A paste composition can be produced by dispersing an inorganic fine particle in the binder resin composition of the present invention.

The present invention also provides an inorganic fine particle-dispersed paste composition, which contains a binder resin composition containing a binder comprising a (meth) acrylic resin, an organic compound having 3 or more hydroxyl groups and an organic solvent, and contains an inorganic fine particle, the content of the organic compound having 3 or more hydroxyl groups being 0.1 to 15 parts by weight to 100 parts by weight of the (meth)acrylic resin.

The above-mentioned inorganic fine particle is not particularly limited and that comprises at least one kind of compound selected from the group consisting of phosphor, metal, glass, carbon black, carbon nanotube, metal oxide, and metal complex are preferably used.

Practical examples are copper, silver, nickel, palladium, alumina, zirconia, titanium oxide, barium titanate, alumina nitride, silicon nitride, boron nitride, silicate glass, lead glass, low melting point glass such as $CaO.Al_2O_3.SiO_2$ type inorganic glass, $MgO.Al_2O_3.SiO_2$ type inorganic glass, and $LiO_2.Al_2O_3.SiO_2$ type inorganic glass; phosphors such as ruthenium oxide, yttrium oxide, europium oxide, samarium oxide, cerium oxide, lanthanum oxide, praseodymium oxide, neodymium oxide, gadolinium oxide, terbium oxide, dysprosium oxide, holmium oxide, erbium oxide, thulium oxide, $BaMgAl_{10}O_{17}:Eu$, $Zn_2SiO_4:Mn$, and $(Y, Gd)BO_3:Eu$; various carbon black, carbon nanotube; metal oxides such as titanium oxide and zirconium oxide, and metal complexes, and the like. The inorganic fine particles such as phosphors which have been known as substances to be deteriorated thermally may be usable for obtaining a sintered body in a process where the thermal deterioration is suppressed by using the above-mentioned binder decomposable at a low temperature in combination.

The content of the above-mentioned inorganic fine particle is preferably 10% by weight in the lower limit and 60% by weight in the upper limit to the entire weight of the inorganic fine particle-dispersed paste composition of the present invention. If it is lower than 10% by weight, the paste composition of the present invention cannot be provided with proper thixotropy and cobwebbing and if it exceeds 60% by weight, it may become difficult to carry out dispersion uniformly.

The particle diameter of the above-mentioned inorganic fine particle is not particularly limited, however it is preferably 0.1 μm in the lower limit and 10 μm in the upper limit based on the volume average particle diameter. If it is smaller than 0.1 μm, the inorganic fine particle may not work as basic points of thread breakage at the time of elongation of the inorganic fine particle-dispersed paste composition, and on the other hand, if it exceeds 10 μm, a problem that the inorganic fine particle is clogged in a mesh for screen printing may be caused.

In the case the above-mentioned inorganic fine particle is of a phosphor, the content of the phosphor is preferably 500 parts by weight or less to 100 parts by weight of the solid matter of the above-mentioned binder resin composition. It is more preferably 10 to 400 parts by weight.

The above-mentioned inorganic fine particle is preferably coated with a dispersant comprising a polyether and/or a polyol.

The dispersant in the present invention is used in order to suppress the polarity of the surface of the above-mentioned inorganic fine particle and to improve the dispersibility of the above-mentioned inorganic fine particle.

To improve the dispersibility of the inorganic fine particle, a method of adding a dispersant to a paste composition has been conventionally employed, however by that the above-mentioned inorganic fine particle is coated previously with the dispersant, the paste composition is provided with more excellent storage stability and as a result, the screen printability of the inorganic fine particle-dispersed paste composition of the present invention can be further improved.

The above-mentioned dispersant comprising a polyether and/or a polyol is not particularly limited and preferable examples of the polyether are polyethylene glycol, polypropylene glycol, polytetraethylene glycol, and polymers obtained by graft polymerization of two or more of these glycols, and preferable examples of the polyol are glycerin, neopentyl glycol, monoglycerides, and the like.

Herein, the polyether means those which have a plurality of ether bonds and the polyol means those which have a plurality of hydroxyl groups, and the polyol also includes polyethers having a plurality of hydroxyl groups.

Besides the above-mentioned dispersants, preferable examples of the dispersant may also include diglycerin, trimethylolpropane, pentaerythritol, meso-erythritol, L-threitol, D-threitol, DL-threitol, 2-hydroxymethyl-1,3-propanediol, 1,1,1-trihydroxymethylethane, 1,2,4-butanetriol, 1,2,6-hexanetriol, and the like.

Examples particularly preferable to be used as the above-mentioned dispersant are water-soluble dispersants in a liquid phase at 20° C. and viscous polyols such as glycerin, neopentyl glycol, and monoglyceride. Especially, if the viscous polyols such as glycerin, neopentyl glycol, and monoglyceride in a liquid phase or a slurry state at 20° C. are used as the dispersant, the inorganic fine particle-dispersed paste composition is provided with excellent storage stability.

In the case the above-mentioned inorganic fine particle is of a green phosphor or a blue phosphor such as $Zn_2SiO_4:Mn$ and $BaMgAl_{10}O_{17}:Eu$, dispersants having a molecular weight of 3000 to 8000 are preferably used as the above-mentioned dispersant. If the molecular weight of the dispersant is lower than 3000, viscosity becomes low and thus coagulation of the phosphor cannot be suppressed, and if the molecular weight exceeds 8000, polarity becomes low and thus it becomes difficult to coat the phosphor.

In the case the above-mentioned inorganic fine particle is of a red phosphor such as $(Y, Gd)BO_3:Eu$, viscous polyols such as glycerin, neopentyl glycol, and monoglyceride in a liquid phase or a slurry state at 20° C. are preferably used as the dispersant.

In the present invention, use of a phosphor and a dispersant in the above-mentioned combination improves the affinity of the phosphor with the dispersant covering the phosphor, and reliably suppresses coagulation of the phosphor. As a result, the inorganic fine particle-dispersed paste composition to be obtained is provided with excellent storage stability and screen printability with little alteration with lapse of time.

The inorganic fine particle-dispersed paste composition of the present invention preferably contains the organic fine particle as described above. Addition of the organic fine particle provides the obtained inorganic fine particle-dispersed paste composition with improved cobwebbing and further improved storage stability while keeping the thixotropy appropriate for screen printing.

It is supposedly attributed to the following reasons.

Since an acrylic vehicle comprising a binder comprising a (meth)acrylic resin, an organic compound having 3 or more hydroxyl groups, and an organic solvent can form a hydrogen bond network among the (meth)acrylic resin, the organic compound having 3 or more hydroxyl groups, and the organic solvent, the viscosity can be improved although it is diluted by addition of the organic solvent.

The acrylic vehicle with improved viscosity by such a hydrogen bond shows a so-called thixotropic viscosity characteristic (thixotropy) that the viscosity changes in accordance with the strain rate by addition of inorganic fine particles. It is supposedly attributed to that when strain is applied to the system having the hydrogen bonds at the time of viscosity measurement, the inorganic fine particles move in the system and the number of the hydrogen bonds to be disconnected is fluctuated in accordance with the speed of the movement. The thixotropy of the acrylic vehicle added the inorganic fine particles depends on the viscosity of the acrylic vehicle and the quantity of the inorganic fine particles to be added, and in the case the viscosity of the acrylic vehicle is same, the thixotropy is increased more as the quantity of the inorganic fine particles to be added is higher.

As described above, in the screen printing, if the inorganic fine particle-dispersed paste composition of the present invention shows low viscosity at a high strain rate, the paste composition is excellent in the transfer property from a screen printing plate to a substrate, and if the inorganic fine particle-dispersed paste composition shows high viscosity at a low strain rate or in a static state, the paste composition is prevented from dripping on a substrate from a screen printing plate, except the time of the movement of the squeegee at the time of printing, and the paste composition also shows an excellent form retaining property after printing and is thus provided with improved handling property. Accordingly, if the inorganic fine particle-dispersed paste composition has thixotropy, the paste composition is provided with excellent suitability for printing. Further, the paste composition to be used for screen printing is required to have, besides the thixotropy, excellent cobwebbing as a property of affecting the screen printability, and the cobwebbing of the inorganic fine particle-dispersed paste composition to be used for the screen printing considerably depends on the viscosity of the acrylic vehicle and the content of the inorganic fine particle to be added. In the case the inorganic fine particle-dispersed paste composition has a high content of the inorganic fine particle and a high specific gravity, the paste composition cannot stand the gravity and tends to be cut and therefore hardly shows cobwebbing. On the contrary, in the case the inorganic fine particle-dispersed paste composition has a low content of the inorganic fine particle and a low specific gravity, the paste composition is hardly cut and thus shows rather extreme cobwebbing and adhesion of the acrylic vehicle to the back face of the screen frequently occurs at the time of screen printing.

That is, if the addition amount of the inorganic fine particle is increased, thixotropy and cobwebbing of the inorganic fine particle-dispersed paste composition to be used for screen printing tend to be improved.

However, generally, the amount of the inorganic fine particles to be added to the paste composition to be used for screen printing cannot be increased in many cases because of the production cost and other process restrictions and accordingly, conventional inorganic fine particle-dispersed paste compositions to which the inorganic fine particle is added have not necessarily been provided with sufficient thixotropy or cobwebbing.

Further, in the case it is tried to improve the thixotropy of the paste composition by adding the organic compound having 3 or more hydroxyl groups, a large quantity of the organic compound having 3 or more hydroxyl groups is required and consequently, problems of decomposability and storage stability are caused and in addition, since the amount of the inorganic fine particle to be dispersed in the acrylic vehicle is determined in accordance with the screen printing conditions, it sometimes becomes impossible to add the inorganic fine particle in an amount appropriate to improve the cobwebbing of the inorganic fine particle-dispersed paste composition.

On the contrary, since the organic fine particle is added in addition to the inorganic fine particle, the organic fine particle works as basic points of thread breakage at the time of elongation of the inorganic fine particle-dispersed paste composition and thus compensate for the insufficiency of thixotropy and cobwebbing attributed to the lack of the inorganic fine particle and further, since the organic fine particle is excellent in dispersion stability in the acrylic vehicle, the inorganic fine particle-dispersed paste composition containing the organic fine particle is that which is excellent in storage stability and which has scarcely changeable screen printability with the lapse of time.

In the case the inorganic fine particle-dispersed paste composition of the present invention contains the above-mentioned organic fine particle, in order to provide thixotropy and cobwebbing excellent in screen printability, if the content of the binder comprising the (meth)acrylic resin is 40% by weight or less, the content of the above-mentioned organic fine particle is preferably 1% by weight in the lower limit and 5% by weight in the upper limit and on the other hand, if the content of the binder comprising the (meth)acrylic resin exceeds 40% by weight, the content of the organic fine particle is preferably 0.1% by weight in the lower limit and 1% by weight in the upper limit, based on the entire inorganic fine particle-dispersed paste composition of the present invention.

The content of the above-mentioned organic fine particle is not particularly limited, however it is preferably 0.1% by weight in the lower limit and 20% by weight in the upper limit to the entire inorganic fine particle-dispersed paste composition of the present invention. If it is less than 0.1% by weight, no sufficient effect for improving thixotropy and cobwebbing can be caused and if it exceeds 20% by weight, the paste viscosity is increased and the screen printability may be decreased. It is more preferably 0.5% by weight in the lower limit and 5% by weight in the upper limit.

The inorganic fine particle-dispersed paste composition of the present invention may further contain additives such as a viscosity adjustment agent and a surfactant.

Non-limiting examples of the viscosity adjustment agent are glycerin, diglycerin, trimethylolpropane, pentaerythritol, meso-erythritol, L-threitol, D-threitol, DL-threitol, 2-hydroxymethyl-1,3-propanediol, 1,1,1-trihydroxymethylethane, 1,2,4-butanetriol, 1,2,6-hexanetriol and the like.

The substances which are exemplified both as the above-mentioned dispersant and the viscosity adjustment agent may be properly selected and used.

Non-limiting examples of the above-mentioned surfactant are polyoxyethylene lauryl fatty acid, polyoxyethylene-hardened castor oil, glycerin fatty acid ester, propylene glycol fatty acid ester, polyoxyethylenealkylamine, alkylalkanolamide, polyoxyethylene fatty acid ester, polyoxyethylene lauryl ether, polyoxyethylene cetyl/stearyl ether, polyoxyethylene oleyl ether, polyoxyethylene alkyl ether, polyoxyethylene myristyl ether, polyoxyalkylene octyl ether, polyoxyalkylene decyl ether as well as polyoxyethylene derivative sorbitan fatty acid ester, polyoxyethylene sorbitan fatty acid ester, polyoxyethylene sorbitol fatty acid ester and the like.

The addition amount of the above-mentioned additives such as the viscosity adjustment agent and the surfactant are not particularly limited, however it is preferably 10 parts by weight in the lower limit and 100 parts by weight in the upper limit to 100 parts by weight of the inorganic fine particle-dispersed paste composition of the present invention.

The viscosity of the inorganic fine particle-dispersed paste composition of the present invention is not particularly limited, however it is preferably 50 Pa·s or lower when the viscosity is measured at 23° C. using a B-model viscometer set at a probe rotation frequency of 30 rpm. If it exceeds 50 Pa·s, cobwebbing may become inferior and screen printability may be deteriorated.

In the case the above-mentioned inorganic fine particle is a phosphor, the chlorine atom concentration in the inorganic fine particle-dispersed paste composition of the present invention is 100 ppm or lower when being measured by an ion chromatogram measurement apparatus. This is because if the chlorine atom concentration exceeds the above-mentioned range, it is supposed that chlorine atoms lower the emission intensity of the phosphor and shorten emission lifetime of the phosphor.

A method of suppressing the chlorine atom concentration to 100 ppm or lower in the inorganic fine particle-dispersed paste composition of the present invention may be a method using a raw material with a chlorine atom concentration of 100 ppm or lower. For example, in the case of producing monomers with a chlorine atom concentration of 100 ppm or lower, chlorine may be removed from the monomer by subjecting the monomer to ion-exchange column chromatography. Further, the chlorine atom concentration may be lowered to 100 ppm or lower by repeating washing with water. It is more preferably 50 ppm or lower and even more preferably not more than the detection limit of the ion chromatogram measurement apparatus.

The inorganic fine particle-dispersed paste composition of the present invention preferably comprises an organic solvent evaporated at lower than 300° C. and a binder comprising a (meth)acrylic resin depolymerized and decomposed at lower than 400° C. If the inorganic fine particle-dispersed paste composition of the present invention is a composition as described above, the low temperature firing is made possible, and in the case a phosphor is used for the inorganic fine particle, the inorganic fine particle-dispersed paste composition of the present invention can be preferably used for formation of a phosphor face of various kinds of display apparatuses such as PDP (Plasma Display Panel), and FED (Field Emission Display), SED (Surface Conduction Electron Emission Display).

The method of producing the inorganic fine particle-dispersed paste composition of the present invention is not particularly limited and conventionally known stirring methods may be employed. More practically, the method may be a stirring method of stirring the above-mentioned binder resin composition, the inorganic fine particle, and the like by three rolls, a beads mill, a planetary stirrer, or the like.

The inorganic fine particle-dispersed paste composition of the present invention may be either in a liquid phase or a solid state.

In the case of being in a solid state, the inorganic fine particle-dispersed paste composition preferably is in a sheet-like or film-like form. In the case the paste composition is in a sheet-like form, a conventionally known additive for sheet formation such as gelling agent may be added to a liquid-phase inorganic fine particle-dispersed paste composition and then the resulting paste composition is formed in a sheet-like form to produce the inorganic fine particle-dispersed paste composition in the sheet-like form.

The above-mentioned formation of the phosphor face may be carried out by a conventionally method and for example, in the case the inorganic fine particle (phosphor)-dispersed paste composition of the present invention is in a liquid phase, the phosphor face may be produced by applying the inorganic fine particle (phosphor)-dispersed paste composition to a substrate by a conventionally known method such as screen printing, bar code printing, a curtain coater, or a slot coater, successively carrying out various steps for solvent removal or the like as desired, and thereafter firing the paste composition. In addition, in the case the inorganic fine particle (phosphor)-dispersed paste composition of the present invention is in a sheet-like form, the phosphor face may be produced by laminating or transferring the sheet-like inorganic fine particle (phosphor)-dispersed paste composition to a substrate, successively carrying out various steps as desired, and thereafter firing the paste composition.

The firing temperature is preferably in a range from 400 to 800° C. in the case of a conventional inorganic fine particle-dispersed paste composition, however since the inorganic fine particle-dispersed paste composition of the present invention is constituted as described above, firing can be carried out at a temperature in a range from 250 to 400° C.

The firing duration is not limited, however it is preferably 1 minute in the lower limit and 60 minutes in the upper limit, and more preferably 2 minutes in the lower limit and 30 minutes in the upper limit.

EFFECT OF THE INVENTION

According to the present invention, it is made possible to provide a binder resin composition usable for an inorganic fine particle-dispersed paste composition which is excellent in thixotropy and storage stability, has scarcely changeable screen printability with the lapse of time, and can be fired at a low temperature, and to provide the inorganic fine particle-dispersed paste composition.

BEST MODE FOR CARRYING OUT THE INVENTION

Hereinafter, the present invention will be described in details with reference to examples, however the present invention is not limited to these examples.

EXAMPLE 1

A monomer-mixed solution was obtained by mixing 100 parts by weight of isobutyl methacrylate (IBMA), dodecyl mercaptan (DDM) as a chain transfer agent, and 50 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a butyl carbitol solution containing a (meth)acrylic resin was obtained.

The obtained polymer was analyzed by gel permeation chromatography (GPC) to find that the number average molecular weight based on conversion into polystyrene was 10000.

The number average molecular weight based on conversion into polystyrene was measured by GPC using column LF-804 manufactured by SHOKO Co., Ltd.

Further, 5 parts by weight of glycerin as an organic compound having 3 or more hydroxyl groups were added to the obtained reaction product and the resulting mixture was sufficiently kneaded by a high speed stirring apparatus to produce a binder resin composition.

EXAMPLE 2

A binder resin composition was produced in the same method as Example 1, except that 100 parts by weight of methyl methacrylate (MMA) was used in place of 100 parts by weight of isobutyl methacrylate (IBMA).

COMPARATIVE EXAMPLE 1

A binder resin composition was produced in the same method as Example 1, except that no glycerin was used.

COMPARATIVE EXAMPLE 2

A binder resin composition was produced in the same method as Example 1, except that 5 parts by weight of ethylene glycol methyl ether as an organic compound having one hydroxyl group was used in place of glycerin.

COMPARATIVE EXAMPLE 3

A binder resin composition was produced in the same method as Example 1, except that 5 parts by weight of diethylene glycol as an organic compound having two hydroxyl groups was used in place of glycerin.

<Evaluation>

The binder resin compositions obtained in Examples 1 to 2 and Comparative Examples 1 to 3 were subjected to the following evaluations. The results are shown in Table 1.

(1) Thixotropy Evaluation

The viscosity of each binder resin compositions was measured immediately after production and after storage for 1 month at 23° C. using a B-model viscometer (DVII+Pro, manufactured by Brookfield Engineering Laboratories, Inc.) at 23° C. and rotation speeds of 5 rpm and 30 rpm, respectively. The viscosity ratio (viscosity at 5 rpm/viscosity at 30 rpm) was calculated from the measured viscosity values and if the composition had a viscosity ratio of 1.5 or higher, the composition was evaluated to be excellent in thixotropy.

TABLE 1

| | thixotropy evaluation | |
|---|---|---|
| | immediately after production | after storage for 1 month at 23° C. |
| Example 1 | 1.5 | 1.5 |
| Example 2 | 2.4 | 2.4 |
| Comparative Example 1 | 1.0 | 1.0 |
| Comparative Example 2 | 1.0 | 1.0 |
| Comparative Example 3 | 1.1 | 1.1 |

EXAMPLE 3

A monomer-mixed solution was obtained by mixing 100 parts by weight of methyl methacrylate (MMA), dodecyl mercaptan (DDM) as a chain transfer agent, and 300 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a butyl carbitol solution containing a (meth)acrylic resin was obtained.

The obtained polymer was analyzed by gel permeation chromatography (GPC) to find that the number average molecular weight based on conversion into polystyrene was as shown in Table 2.

The number average molecular weight based on conversion into polystyrene was measured by GPC using column LF-804 manufactured by SHOKO Co., Ltd.

A binder resin composition was produced by adding 6 parts by weight of glycerin as the organic compound having 3 or more hydroxyl groups to the butyl carbitol solution containing the produced polymer, and then dispersing the resulting solution by a high speed dispersing apparatus.

Further, 170 parts by weight of $Zn_2SiO_4$:Mn (green phosphor: manufactured by NICHIA Corporation), which is a phosphor, were added as an inorganic fine particle and the resulting mixture was sufficiently kneaded by a high speed stirring apparatus to produce an inorganic fine particle-dispersed paste composition.

EXAMPLE 4

A binder resin composition was produced and successively an inorganic fine particle-dispersed paste composition was produced in the same method as Example 3, except that 100 parts by weight of isobutyl methacrylate (IBMA) was used in place of 100 parts by weight of methyl methacrylate (MMA).

EXAMPLE 5

A binder resin composition was produced and successively an inorganic fine particle-dispersed paste composition was produced in the same method as Example 3, except that a monomer-mixed solution was obtained by mixing 95 parts by weight of methyl methacrylate (MMA), 5 parts by weight of polypropylene glycol monomethacrylate (Blemmer PP1000, manufactured by NOF Corporation) as the (meth)acrylate having a hydrogen-bonding functional group and containing a polyoxyalkylene side chain, dodecyl mercaptan (DDM) as a chain transfer agent, and 300 parts by weight of butyl carbitol as an organic solvent.

EXAMPLE 6

A binder resin composition was produced and successively an inorganic fine particle-dispersed paste composition was produced in the same method as Example 3, except that a monomer-mixed solution was obtained by mixing 95 parts by weight of isobutyl methacrylate (IBMA), 5 parts by weight of polypropylene glycol monomethacrylate (Blemmer PP1000, manufactured by NOF Corporation) as the (meth)acrylate having a hydrogen-bonding functional group and containing a polyoxyalkylene side chain, dodecyl mercaptan (DDM) as a chain transfer agent, and 300 parts by weight of butyl carbitol as an organic solvent.

EXAMPLE 7

A binder resin composition was produced and successively an inorganic fine particle-dispersed paste composition was produced in the same method as Example 3, except that a monomer-mixed solution was obtained by mixing 90 parts by weight of methyl methacrylate (MMA), 10 parts by weight of polypropylene glycol monomethacrylate (Blemmer PP1000, manufactured by NOF Corporation) as the (meth)acrylate having a hydrogen-bonding functional group and containing a polyoxyalkylene side chain, dodecyl mercaptan (DDM) as containing a chain transfer agent, and 300 parts by weight of butyl carbitol as an organic solvent.

EXAMPLES 8 to 10

Respective binder resin compositions were produced and successively inorganic fine particle-dispersed paste compositions were produced in the same method as Example 7, except that the contents of methyl methacrylate (MMA) and polypropylene glycol monomethacrylate (Blemmer PP1000, manufactured by NOF Corporation) were changed as shown in Table 3.

EXAMPLE 11

A monomer-mixed solution was obtained by mixing 95 parts by weight of methyl methacrylate (MMA), 5 parts by weight of polypropylene glycol monomethacrylate (Blemmer PP1000, manufactured by NOF Corporation) as the (meth)acrylate having a hydrogen-bonding functional group and containing a polyoxyalkylene side chain, dodecyl mercaptan (DDM) as a chain transfer agent, and 300 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a butyl carbitol solution containing a (meth)acrylic resin having the polyoxyalkylene side chain was obtained.

The obtained polymer was analyzed by gel permeation chromatography (GPC) to find that the number average molecular weight based on conversion into polystyrene was as shown in Table 4.

The number average molecular weight based on conversion into polystyrene was measured by GPC using column LF-804 manufactured by SHOKO Co., Ltd.

A binder resin composition was produced by adding 0.1 parts by weight of glycerin as the organic compound having 3 or more hydroxyl groups to the butyl carbitol solution containing the produced polymer, and then dispersing the resulting solution by a high speed dispersing apparatus.

Further, 170 parts by weight of $Zn_2SiO_4$:Mn (green phosphor: manufactured by NICHIA Corporation), which is a phosphor, were added as an inorganic fine particle and the resulting mixture was sufficiently kneaded by a high speed stirring apparatus to produce an inorganic fine particle-dispersed paste composition.

EXAMPLES 12 to 17

Respective binder resin compositions were produced and successively inorganic fine particle-dispersed paste compositions were produced in the same method as Example 11, except that the contents of glycerin and the phosphor were changed as shown in Table 4.

EXAMPLE 18

A monomer-mixed solution was obtained by mixing 95 parts by weight of methyl methacrylate (MMA), 5 parts by weight of polypropylene glycol monomethacrylate (Blemmer PP1000, manufactured by NOF Corporation) as the (meth)acrylate having a hydrogen-bonding functional group and containing a polyoxyalkylene side chain, dodecyl mercaptan (DDM) as a chain transfer agent, and 300 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a butyl carbitol solution containing a (meth)acrylic resin having the polyoxyalkylene side chain was obtained.

The obtained polymer was analyzed by gel permeation chromatography (GPC) to find that the number average molecular weight based on conversion into polystyrene was as shown in Table 5.

The number average molecular weight based on conversion into polystyrene was measured by GPC using column LF-804 manufactured by SHOKO Co., Ltd.

A binder resin composition was produced by adding 6 parts by weight of glycerin as the organic compound having 3 or more hydroxyl groups to the butyl carbitol solution containing the produced polymer, and then dispersing the resulting solution by a high speed dispersing apparatus.

Further, 176 parts by weight of $Zn_2SiO_4$:Mn (green phosphor: manufactured by NICHIA Corporation), which is a phosphor, as an inorganic fine particle and 6 parts by weight of a crosslinked acrylic fine particle (Art Pearl J-4P, manufactured by Negami Chemical Industrial Co., Ltd.; volume average particle diameter 2.2 μm) as an organic fine particle were added and the resulting mixture was sufficiently kneaded by a high speed stirring apparatus to produce an inorganic fine particle-dispersed paste composition.

EXAMPLE 19

A binder resin composition was produced and successively an inorganic fine particle-dispersed paste composition was produced in the same method as Example 18, except that the addition amounts of butyl carbitol, the phosphor, and the organic fine particles were changed to 326 parts by weight, 33 parts by weight, and 33 parts by weight, respectively.

EXAMPLE 20

A monomer-mixed solution was obtained by mixing 95 parts by weight of methyl methacrylate (MMA), 5 parts by weight of polypropylene glycol monomethacrylate (Blemmer PP1000, manufactured by NOF Corporation) as the (meth)acrylate having a hydrogen-bonding functional group and containing a polyoxyalkylene side chain, dodecyl mercaptan (DDM) as a chain transfer agent, and 111 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a butyl carbitol solution containing a (meth)acrylic resin having the polyoxyalkylene side chain was obtained.

The obtained polymer was analyzed by gel permeation chromatography (GPC) to find that the number average molecular weight based on conversion into polystyrene was as shown in Table 5.

The number average molecular weight based on conversion into polystyrene was measured by GPC using column LF-804 manufactured by SHOKO Co., Ltd.

A binder resin composition was produced by adding 3 parts by weight of glycerin as the organic compound having 3 or more hydroxyl groups to the butyl carbitol solution containing the produced polymer, and then dispersing the resulting solution by a high speed dispersing apparatus.

Further, 49 parts by weight of polypropylene glycol ether (Uniol D-4000, manufactured by NOF Corporation; molecular weight 4000) was kneaded with 112 parts by weight of $Zn_2SiO_4$:Mn (green), which is a phosphor, as an inorganic fine particle by a high speed dispersing apparatus and sufficiently kneaded by a three-roll kneader while the intervals of the rolls were gradually narrowed until the kneaded mixture became smooth and consequently, inorganic fine particles coated with the polypropylene glycol ether were obtained.

An inorganic fine particle-dispersed paste composition was produced by mixing 161 parts by weight of the inorganic fine particles coated with the polypropylene glycol ether to 214 parts by weight of the previously produced binder resin composition, and then dispersing by a high speed dispersing apparatus.

EXAMPLE 21

A binder resin composition was produced and successively an inorganic fine particle-dispersed paste composition was produced in the same method as Example 20, except that the content of butyl carbitol was changed to 105 parts by weight and 6 parts by weight of a crosslinked acrylic fine particle (Art Pearl J-4P, manufactured by Negami Chemical Industrial Co., Ltd.; volume average particle diameter 2.2 μm) as an organic fine particle were added.

COMPARATIVE EXAMPLE 4

A monomer-mixed solution was obtained by mixing 100 parts by weight of methyl methacrylate (MMA), dodecyl mercaptan (DDM) as a chain transfer agent, and 300 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a binder resin composition containing a (meth)acrylic resin was obtained.

Further, 170 parts by weight of $Zn_2SiO_4$:Mn (green phosphor: manufactured by NICHIA Corporation), which is a phosphor, as an inorganic fine particle were added and the resulting mixture was sufficiently kneaded by a high speed stirring apparatus to produce an inorganic fine particle-dispersed paste composition.

COMPARATIVE EXAMPLE 5

A binder resin composition was produced and successively an inorganic fine particle-dispersed paste composition was produced in the same method as Comparative Example 4, except that 95 parts by weight of methyl methacrylate (MMA) and 5 parts by weight of polypropylene glycol monomethacrylate (Blemmer PP1000, manufactured by NOF Corporation) as the methacrylate having a hydrogen-bonding functional group and containing a polyoxyalkylene side chain were added in place of 100 parts by weight of methyl methacrylate (MMA).

COMPARATIVE EXAMPLE 6

A monomer-mixed solution was obtained by mixing 100 parts by weight of methyl methacrylate (MMA), dodecyl mercaptan (DDM) as a chain transfer agent, and 300 parts by weight of butyl carbitol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a butyl carbitol solution containing a (meth)acrylic resin was obtained.

A binder resin composition was produced by adding 3 parts by weight of diethylene glycol to the butyl carbitol solution containing the produced polymer, and then dispersing the resulting solution by a high speed dispersing apparatus.

Further, 170 parts by weight of $Zn_2SiO_4$:Mn (green phosphor: manufactured by NICHIA Corporation), which is a phosphor, were added as an inorganic fine particle and the resulting mixture was sufficiently kneaded by a high speed stirring apparatus to produce an inorganic fine particle-dispersed paste composition.

COMPARATIVE EXAMPLE 7

A binder resin composition was produced and successively an inorganic fine particle-dispersed paste composition was produced in the same method as Comparative Example 6, except that 95 parts by weight of methyl methacrylate (MMA) and 5 parts by weight of polypropylene glycol monomethacrylate (Blemmer PP1000, manufactured by NOF Corporation) as the methacrylate having a hydrogen-bonding functional group and containing a polyoxyalkylene side chain were added in place of 100 parts by weight of methyl methacrylate (MMA).

COMPARATIVE EXAMPLE 8

A binder resin composition was produced and successively an inorganic fine particle-dispersed paste composition was produced in the same method as Comparative Example 6, except that 3 parts by weight of ethylene glycol methyl ether was added in place of 3 parts by weight of diethylene glycol.

COMPARATIVE EXAMPLE 9

A binder resin composition was produced and successively an inorganic fine particle-dispersed paste composition was produced in the same method as Comparative Example 7, except that 3 parts by weight of ethylene glycol methyl ether was added in place of 3 parts by weight of diethylene glycol.

<Evaluation>

The binder resin compositions and inorganic fine particle-dispersed paste compositions obtained in Examples 3 to 21 and Comparative Examples 4 to 9 were subjected to the following evaluations. The results are shown in Tables 2 to 6.

(1) Thixotropy Evaluation

The viscosity of each inorganic fine particle-dispersed paste compositions was measured immediately after production and after storage for 1 month at 23° C. using a B-model viscometer at an ordinary temperature and rotation speeds of 1 rpm and 50 rpm, respectively. The viscosity ratio (viscosity at 1 rpm/viscosity at 50 rpm) was calculated from the measured viscosity values and if the composition had a viscosity ratio of 1.5 or higher, the composition was evaluated to be excellent in thixotropy.

(2) Storage Stability

The storage stability was evaluated by eye observation based on whether phase separation (bleeding of an oily substance) of each of the obtained inorganic fine particle-dispersed paste compositions occurred or not after 1 month storage of the composition at 23° C. Complete phase separation means the state that the inorganic fine particle-dispersed paste composition was separated to two phases and precipitation of the inorganic fine particles was observed, and the viscosity of the supernatant solution was decreased.

◎: no phase separation occurred and the composition showed luster
○: no phase separation occurred
Δ: slight phase separation occurred
X: complete phase separation occurred (3) Evaluation of Coloration after Firing Each of the obtained binder resin compositions was coated evenly in a thickness of 5 mm to a glass plate with a surface area of 10 cm×10 cm by an applicator and dried for 10 minutes in an oven set at 120° C. to dry out the solvent contained in the binder.

The glass-plate from which the solvent was dried out was fired at 350° C. for 30 minutes in an electric furnace and after cooling, coloration of the glass plate surface was evaluated by eye observation.

◎: no coloration occurred
○: coloration scarcely occurred
X: coloration occurred

TABLE 2

|  | Example 3 | Example 4 | Example 5 | Example 6 |
|---|---|---|---|---|
| methyl methacrylate(MMA) | 100 | — | 95 | — |
| isobutyl methacrylate(IBMA) | — | 100 | — | 95 |
| polypropylene glycol monomethacrylate(PP1000) | — | — | 5 | 5 |
| Mn(10000) | 3 | 3 | 3 | 3 |
| butyl carbitol | 300 | 300 | 300 | 300 |
| glycerin | 6 | 6 | 6 | 6 |
| inorganic fine particles (phosphor) | 170 | 170 | 170 | 170 |
| thixotropy    immediately after production | 4 | 3 | 8 | 5 |
|                    after storage for 1 month at 23° C. | 4 | 3 | 8 | 5 |
| storage stability | ○ | ○ | ◎ | ◎ |
| evaluation of coloration after firing | ◎ | ○ | ◎ | ○ |

TABLE 3

|  | Example 7 | Example 8 | Example 9 | Example 10 |
|---|---|---|---|---|
| methyl methacrylate(MMA) | 90 | 80 | 70 | 50 |
| polypropylene glycol monomethacrylate(PP1000) | 10 | 20 | 30 | 50 |
| Mn(10000) | 3 | 3 | 3 | 3 |
| butyl carbitol | 300 | 300 | 300 | 300 |
| glycerin | 6 | 6 | 6 | 6 |
| inorganic fine particles (phosphor) | 170 | 170 | 170 | 170 |

TABLE 3-continued

|  |  | Example 7 | Example 8 | Example 9 | Example 10 |
|---|---|---|---|---|---|
| thixotropy | immediately after production | 8 | 8 | 7 | 4 |
|  | after storage for 1 month at 23° C. | 8 | 8 | 7 | 4 |
| storage stability |  | ⊚ | ⊚ | ⊚ | ⊚ |
| evaluation of coloration after firing |  | ⊚ | ⊚ | ⊚ | ○ |

TABLE 4

|  | Example 11 | Example 12 | Example 13 | Example 14 | Example 15 | Example 16 | Example 17 |
|---|---|---|---|---|---|---|---|
| methyl methacrylate(MMA) | 95 | 95 | 95 | 95 | 95 | 95 | 95 |
| polypropylene glycol monomethacrylate(PP1000) | 5 | 5 | 5 | 5 | 5 | 5 | 5 |
| Mn(10000) | 3 | 3 | 3 | 3 | 3 | 3 | 3 |
| butyl carbitol | 300 | 300 | 300 | 300 | 300 | 300 | 300 |
| glycerin | 0.1 | 1 | 3 | 8 | 10 | 12 | 15 |
| inorganic fine particles (phosphor) | 170 | 170 | 170 | 170 | 170 | 170 | 170 |
| thixotropic property  immediately after production | 1.5 | 2 | 8 | 10 | 10 | 12 | 14 |
| after storage for 1 month at 23° C. | 1.5 | 2 | 8 | 10 | 10 | 12 | 14 |
| storage stability | ⊚ | ⊚ | ⊚ | ⊚ | ⊚ | ○ | ○ |
| evaluation of coloration after firing | ⊚ | ⊚ | ⊚ | ⊚ | ⊚ | ⊚ | ○ |

TABLE 5

|  | Example 18 | Example 19 | Example 20 | Example 21 |
|---|---|---|---|---|
| methyl methacrylate(MMA) | 95 | 95 | 95 | 95 |
| polypropylene glycol monomethacrylate(PP1000) | 5 | 5 | 5 | 5 |
| Mn(10000) | 3 | 3 | 1.5 | 1.5 |
| butyl carbitol | 300 | 326 | 111 | 105 |
| glycerin | 6 | 6 | 3 | 3 |
| organic fine particles | 6 | 33 | — | 6 |
| inorganic fine particles(phosphor) | 176 | 33 | 112 | 112 |
| dispersant | — | — | 49 | 49 |
| thixotropy  immediately after production | 12 | 14 | 10 | 12 |
| after storage for 1 month at 23° C. | 12 | 14 | 10 | 12 |
| storage stability | ⊚ | ⊚ | ⊚ | ⊚ |
| evaluation of coloration after firing | ⊚ | ⊚ | ⊚ | ⊚ |

TABLE 6

|  | Comparative Example 4 | Comparative Example 5 | Comparative Example 6 | Comparative Example 7 | Comparative Example 8 | Comparative Example 9 |
|---|---|---|---|---|---|---|
| methyl methacrylate(MMA) | 100 | 95 | 100 | 95 | 100 | 95 |
| polypropylene glycol monomethacrylate(PP1000) | — | 5 | — | 5 | — | 5 |
| butyl carbitol | 300 | 300 | 300 | 300 | 300 | 300 |
| glycerin | — | — | — | — | — | — |
| diethylene glycol | — | — | 3 | 3 | — | — |
| ethylene glycol methyl ether | — | — | — | — | 3 | 3 |
| inorganic fine particles(phosphor) | 170 | 170 | 170 | 170 | 170 | 170 |
| thixotropic property  immediately after production | 1 | 1 | 1 | 1 | 1 | 1 |
| after storage for 1 month at 23° C. | 1 | 1 | 1 | 1 | 1 | 1 |
| storage stability | ○ | ○ | ○ | ○ | ○ | ○ |
| evaluation of coloration after firing | ○ | ○ | ○ | ○ | ○ | ○ |

EXAMPLE 22

A monomer-mixed solution was obtained by mixing 100 parts by weight of isobutyl methacrylate (IBMA), dodecyl mercaptan (DDM) as a chain transfer agent, and 50 parts by weight of terpineol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 6 hours from starting of the polymerization, the monomer-mixed solution was cooled to a room temperature to finish the polymerization. Accordingly, a terpineol solution containing a (meth)acrylic resin was obtained. The obtained (meth)acrylic resin was analyzed by gel permeation chromatography (GPC) to find that the number average molecular weight based on conversion into polystyrene was 10000.

The number average molecular weight based on conversion into polystyrene was measured by GPC using column LF-804 manufactured by SHOKO Co., Ltd.

The produced (meth)acrylic resin was blended to the terpineol solution as shown in Table 7 and dispersed by a high speed dispersing apparatus.

Further, glycerin as the organic compound having 3 or more hydroxyl groups, $Zn_2SiO_4$:Mn (green phosphor: manufactured by NICHIA Corporation), which is a phosphor, as an inorganic fine particle, and a crosslinked acrylic fine particle (Art Pearl J-4P, manufactured by Negami Chemical Industrial Co., Ltd.; volume average particle diameter 2.2 μm) as an organic fine particle were blended as shown in Table 7 and the resulting mixture was sufficiently kneaded by a high speed stirring apparatus to obtain an inorganic fine particle-dispersed paste composition.

EXAMPLES 23 to 27

A monomer-mixed solution was obtained by mixing 80 parts by weight of methyl methacrylate (MMA), 20 parts by weight of polypropylene glycol monomethacrylate (Blemmer PP1000, manufactured by NOF Corporation) as the (meth)acrylate having a hydrogen-bonding functional group and containing a polyoxyalkylene side chain, a chain transfer agent (DDM), and 50 parts by weight of terpineol as an organic solvent in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 6 hours from starting of the polymerization, the monomer-mixed solution was cooled to a room temperature to finish the polymerization. Accordingly, a terpineol solution containing a (meth)acrylic resin having the polyoxyalkylene side chains was obtained. The obtained (meth)acrylic resin having the polyoxyalkylene side chains was analyzed by gel permeation chromatography (GPC) to find that the number average molecular weight based on conversion into polystyrene was 10000.

The number average molecular weight based on conversion into polystyrene was measured by GPC using column LF-804 manufactured by SHOKO Co., Ltd.

The produced (meth)acrylic resin was blended to the terpineol solution as shown in Table 7 and dispersed by a high speed dispersing apparatus.

Further, glycerin as the organic compound having 3 or more hydroxyl groups, $Zn_2SiO_4$:Mn (green phosphor: manufactured by NICHIA Corporation), which is a phosphor, as an inorganic fine particle, and a crosslinked acrylic fine particle (Art Pearl J-4P, manufactured by Negami Chemical Industrial Co., Ltd.; volume average particle diameter 2.2 μm) as an organic fine particle were blended as shown in Table 7 and each resulting mixture was sufficiently kneaded by a high speed stirring apparatus to obtain an inorganic fine particle-dispersed paste composition.

<Evaluation>

The inorganic fine particle-dispersed paste compositions obtained in Examples 22 to 27 were subjected to the following evaluations. The results are shown in Table 7.

(1) Thixotropy Evaluation

The viscosity of each sinterable inorganic fine particle-dispersed paste compositions was measured immediately after production and after storage for 1 month at 23° C. using a B-model viscometer (DVII+Pro, manufactured by Brookfield Engineering Laboratories, Inc.) at 23° C. and rotation speeds of 5 rpm and 30 rpm, respectively. The viscosity ratio (viscosity at 5 rpm/viscosity at 30 rpm) was calculated from the measured viscosity values and if the composition had a viscosity ratio of 1.5 or higher, the composition was evaluated to be excellent in thixotropy.

(2) Evaluation of Cobwebbing

A stainless pick with a diameter of 2.6 mm and a sharp tip end was stuck to a depth of 10 mm in each sinterable inorganic fine particle-dispersed paste composition obtained in Examples and Comparative Examples and vertically pulled out at a constant speed of 500 mm/min. After the paste composition adhered to the stainless pick was elongated, pulling up of the pick was stopped and the length of the elongation (cobwebbing) of the paste composition was stabilized. Thereafter, the stainless pick was laid down at a 90 degrees angle and the length from the tip end of the length was measured. If the length of the cobwebbing was 10 mm or shorter, the composition was evaluated to be excellent in the cobwebbing.

(3) Storage Stability

The storage stability was evaluated by eye observation based on whether phase separation (bleeding of an oily substance) of each of the obtained paste compositions occurred or not after 1 month storage of the composition at 23° C. Complete phase separation means the state that the paste composition was separated to two phases and precipitation of the inorganic fine particles was observed, and the viscosity of the supernatant solution was decreased.

⊚: no phase separation occurred and the composition showed luster
○: no phase separation occurred
Δ: slight phase separation occurred
X: complete phase separation occurred

TABLE 7

| | Example 22 | Example 23 | Example 24 | Example 25 | Example 26 | Example 27 |
|---|---|---|---|---|---|---|
| (meth)acrylic resin | 50 | 36 | 36 | 44 | 51 | 51 |
| terpineol | 10 | 30 | 29 | 20 | 15 | 15 |
| glycerin | 5 | 3 | 3 | 5 | 3.5 | 3 |
| inorganic fine particles(phosphor) | 30 | 30 | 29 | 30 | 30 | 30 |
| organic fine particles | 5 | 1 | 3 | 1 | 0.5 | 1 |

TABLE 7-continued

|  | Example 22 | Example 23 | Example 24 | Example 25 | Example 26 | Example 27 |
|---|---|---|---|---|---|---|
| viscosity (Pa · s) 30 rpm | 40 | 16 | 25.4 | 40 | 59 | 62 |
| thixotropy 5 rpm/30 rpm | 6.7 | 8.2 | 7 | 5.8 | 4.8 | 5 |
| stringiness(mm) | 7.9 | 4.4 | 6.2 | 7.2 | 9.4 | 9.1 |
| storage stability | ⊚ | ⊚ | ⊚ | ⊚ | ⊚ | ⊚ |

(Experiment 1)

Isobutyl methacrylate (IBMA), polypropylene glycol monomethacrylate, and glycerol methacrylate to be used as monomers were previously subjected to ion-exchange chromatography to remove chlorine contained in the respective monomers. Dodecyl mercaptan (DDM) as a chain transfer agent, terpineol, a polymerization initiator, and ethyl acetate all free from chlorine were prepared.

A monomer-mixed solution was obtained by mixing 85 parts by weight of isobutyl methacrylate (IBMA), 5 parts by weight of polypropylene glycol monomethacrylate (PRGMA, Blemmer PP1000, manufactured by NOF Corporation), 10 parts by weight of glycerol methacrylate (GLM), dodecyl mercaptan (DDM) as a chain transfer agent, 100 parts by weight of terpineol, and 100 parts by weight of trimethylol propane in a 2 L capacity separable flask equipped with a stirrer, a condenser, a thermometer, and a nitrogen gas introduction inlet.

After the obtained monomer-mixed solution was bubbled with nitrogen gas for 20 minutes to remove dissolved oxygen, the system in the separable flask was stirred and heated to the temperature at which the system reached reflux while the system was replaced with nitrogen gas. After the refluxing, a solution of a polymerization initiator diluted with ethyl acetate was added. The ethyl acetate solution containing the polymerization initiator was added several times during the polymerization.

After 7 hours from starting of the polymerization, the monomer-mixed solution was cooled to a room temperature to finish the polymerization. Accordingly, a binder resin composition having the oxyalkylene side chains was obtained.

(Experiment 2)

A binder resin composition was obtained in the same method as Experiment 1, except that chlorine contained in the respective monomers was removed by washing with deionized water but not by ion-exchange chromatography.

(Experiment 3)

A binder resin composition was obtained in the same method as Experiment 1, except that chlorine contained in the respective monomers was not previously removed.

<Evaluation>

The binder resin compositions obtained in Experiments 1 to 3 were subjected to the following evaluations. The results are shown in Table 8.

(1) Measurement of Chlorine Content by Ion Chromatogram Measurement Apparatus

The chlorine content contained in each of the binder resin compositions obtained in Experiments 1 to 3 was quantitatively measured by the chlorine content measurement method as described below using an ion chromatogram measurement apparatus.

Each sample was dried on a hot water bath and about 20 mg of the obtained dried solid matter was weighed precisely on filter paper (No. 7). The inside of a flask in which 10 mL of pure water was poured with a whole pipette was replaced with oxygen. Each sample was burned together with the filter paper in the flask (only the filter paper was burned for blank).

After that, the flask was kept still for about 1 hour, and the flask was shaken to absorb chlorine in the pure water (flask method). The obtained solution was used as a sample solution and subjected to ion chromatography using an ion chromatogram measurement apparatus. The measurement conditions were as follows.

Measurement condition: anion
Apparatus: DIONEX DX-320J
Column: IonPac AG12A-AS12A
Suppresser: ASRS ULTRA
Eluent: 2.7 mM $Na_2CO$
0.3 mM $NaHCO_3$
Flow rate: 1.2 mL/min
Column temperature: 35° C.
Calibration solution: $Cl^-$
Injection amount: 100 μL
Detector: electric conductivity (2) Measurement of Emission Lifetime of Sintered Phosphor A phosphor layer was formed on a substrate for a compact type plasma display for a test by adding 20 parts by weight of a blue phosphor (Europium phosphor containing aluminum, barium, and magnesium) to 100 parts by weight of each of the binder resin compositions obtained in Experiments 1 to 3, diluting the mixture with a solvent, applying the obtained liquid-phase mixture to the substrate, drying the mixture, and sintering the mixture in a light-emitting element form by firing. Plasma was generated for 10 minutes under tenuous xenon-neon mixed gas atmosphere for each of the obtained phosphor layer.

The brightness of the sintered phosphor was measured before plasma generation and after 10 minutes from plasma generation to measure the decrease ratio of the brightness of the sintered phosphor before and after exposure to plasma.

TABLE 8

|  |  | Experiment 1 | Experiment 2 | Experiment 3 |
|---|---|---|---|---|
| monomer composition (part by weight) | IBMA | 85 | 85 | 85 |
|  | PRGMA | 5 | 5 | 5 |
|  | GLM | 10 | 10 | 10 |
| solvent (part by weight) | terpineol | 100 | 100 | 100 |
|  | trimethylolpropane | 100 | 100 | 100 |
| evaluation | chlorine content(ppm) | <0.1[*1] | 89 | 120 |
|  | decrease ratio of brightness of sintered phosphor(%) | 20 | 35 | 50 |

[*1]: "<0.1" means detection limit or lower.

INDUSTRIAL APPLICABILITY

The present invention can provide a binder resin composition usable for an inorganic fine particle-dispersed paste composition which is excellent in thixotropy and storage stability, has scarcely changeable screen printability with the lapse of time, and can be fired at a low temperature, and can provide the inorganic fine particle-dispersed paste composition.

The invention claimed is:

1. A phosphor paste composition, which contains a binder resin composition containing a binder comprising a (meth)acrylic resin that has a constituent unit obtained by reacting a (meth)acrylate monomer having 10 or less carbon atoms in the ester residue and a polyoxyalkylene (meth)acrylate monomer, an organic compound having 3 or more hydroxyl groups and an organic solvent, wherein the organic compound is separate and different from the organic solvent, and contains a phosphor,
the content of the organic compound having 3 or more hydroxyl groups being 0.1 to 15 parts by weight to 100 parts by weight of the (meth)acrylic resin, the organic solvent is a least one selected from terpineol, diethylene glycol monobutyl ether and diethylene glycol n-buthyl ether acetate.

2. The phosphor paste composition according to claim 1, wherein the polyoxyalkylene chain of the polyoxyalkylene (meth)acrylate monomer is polypropylene glycol.

3. The phosphor paste composition according to claim 1, wherein the (meth)acrylic resin is a block copolymer or a graft copolymer.

4. The phosphor paste composition according to claim 1, which further contains an organic fine particle.

5. The phosphor paste composition according to claim 4, wherein the organic fine particle is a crosslinked fine particle.

6. The phosphor paste composition according to claim 4, wherein the organic fine particle is a (meth)acrylic resin fine particle having a constituent unit derived from a (meth)acrylate monomer having 10 or less carbon atoms in the ester residue and a polyoxyalkylene (meth)acrylate monomer.

7. The phosphor paste composition according to claim 4, wherein the content of the organic fine particle is 0.1 to 20% by weight.

8. The phosphor paste composition according to claim 4, wherein the volume average particle diameter of the organic fine particle is 0.1 to 10 μm.

9. The phosphor paste composition according to claim 1, wherein the volume average particle diameter of the phosphor is 0.1 to 10 μm.

10. The phosphor paste composition according to claim 1, wherein the phosphor is coated with a dispersant comprising a polyether and/or a polyol.

11. The phosphor paste composition according to claim 1, wherein the content of the phosphor is 10 to 60% by weight.

12. The phosphor paste composition according to claim 1, wherein the content of the phosphor is 500 parts by weight or less to 100 parts by weight of solid matter of the binder resin composition.

13. The phosphor paste composition according to claim 4, which has a viscosity of 50 Pa·s or lower measured at 23° C. using a B-model viscometer set at a probe rotation frequency of 30 rpm.

14. The phosphor composition according to claim 1, which has a chlorine atom concentration of 100 ppm or lower measured by an ion chromatogram measurement apparatus.

15. The phosphor paste composition according to claim 1, which has a chlorine atom concentration of 50 ppm or lower measured by an ion chromatogram measurement apparatus.

16. The phosphor paste composition according to claim 1, wherein a chlorine atom concentration measured by an ion chromatogram measurement apparatus is not more than the detection limit of the ion chromatogram measurement apparatus.

* * * * *